Oct. 18, 1938.                G. S. HILL                2,133,860
                    FREEZING TRAY FOR REFRIGERATORS
                         Filed June 16, 1937

Inventor:
George S. Hill,
by Harry E. Dunham
His Attorney.

Patented Oct. 18, 1938

2,133,860

UNITED STATES PATENT OFFICE 2,133,860

FREEZING TRAY FOR REFRIGERATORS

George S. Hill, Erie, Pa., assignor to General Electric Company, a corporation of New York Application June 16, 1937, Serial No. 148,476

8 Claims. (Cl. 62—108.5)

My invention relates to trays for containing substances to be frozen or congealed and adapted to be supported upon cooling units of refrigerators of the household type.

While the substance contained in the tray is being congealed, a frozen bond is usually formed between the bottom of the tray and the supporting surface of the cooling unit. In order to remove the tray and its contents from the cooling unit this frozen bond must be broken, and care must be exercised in order to prevent damaging of the cooling unit.

It is an object of my invention to provide an improved arrangement for breaking a frozen bond between a tray adapted to contain a substance to be congealed and a cooling unit upon which the tray is supported.

Another object of my invention is to provide an improved arrangement for lifting a tray adapted to contain a substance to be congealed from a cooling element upon which the tray is supported in order to break the frozen bond therebetween subsequent to congelation of the substance contained in the tray.

Further objects and advantages of my invention will become apparent as the following description proceeds, and the features of novelty which characterize my invention will be pointed out with particularity in the claims annexed to and forming a part of this specification.

Figure 1:
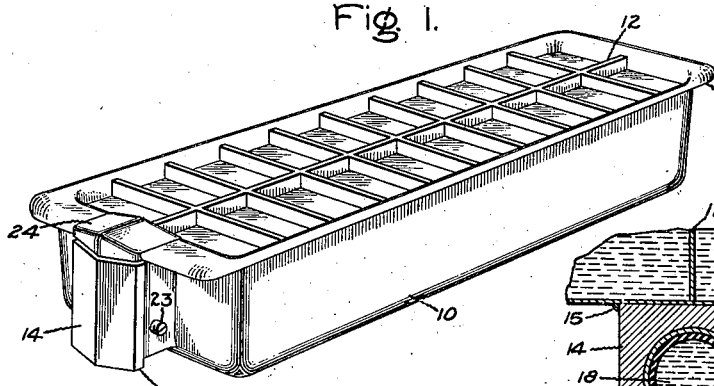
Figure 3:
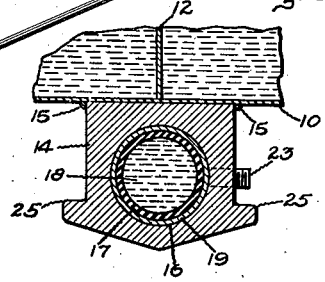
Figure 2:
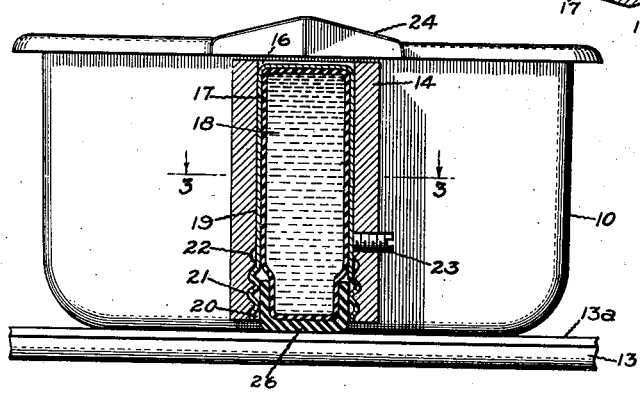
Figure 4:
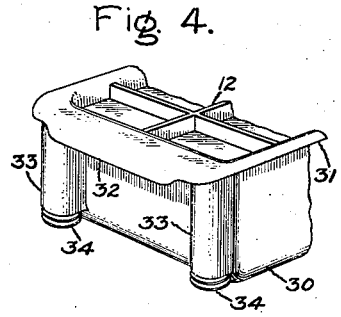
Figure 5:
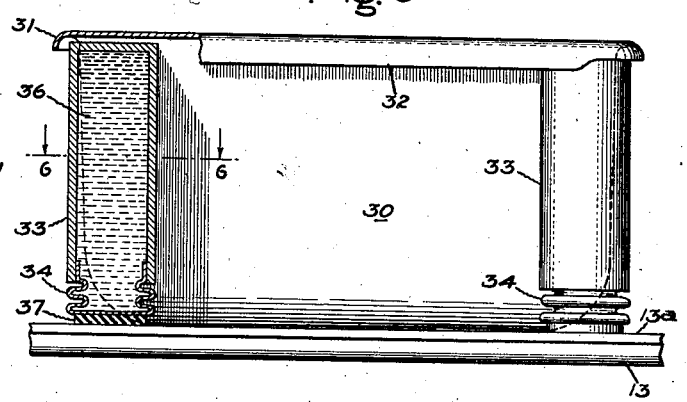
Figure 6:
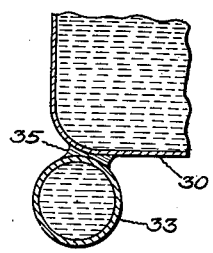

For a better understanding of my invention reference may be had to the accompanying drawing in which Fig. 1 is a perspective view of a freezing tray embodying my invention; Fig. 2 is an end elevation, partly in section, of the freezing tray shown in Fig. 1 and the cooling unit upon which the tray is supported; Fig. 3 is a fragmentary sectional view along the line 3—3 of Fig. 2 of the tray; Fig. 4 is a fragmentary perspective view of a modified form of the freezing tray shown in Fig. 1; Fig. 5 is an enlarged end elevational view, partly in section, of the freezing tray shown in Fig. 4 and the cooling unit upon which the tray is supported; and Fig. 6 is a fragmentary sectional view of the freezing tray along the line 6—6 of Fig. 5.

Referring to the drawing, in Fig. 1 I have shown a shallow rectangular tray or receptacle 10 having a substantially flat bottom and a curved rim 11 about the upper open end thereof which is adapted to contain substances such as water or desserts to be frozen. A partition assembly 12 including a longitudinal partition element and a plurality of transverse partition elements is arranged in the tray 10 in order to divide the contents thereof into a plurality of relatively small compartments in which the substance to be congealed is frozen in the form of blocks. The tray 10 is formed of a material having relatively high heat conductivity, such as aluminum, and is positioned upon the supporting surface 13a of a cooling unit 13 arranged in a mechanical refrigerator of the household type, as shown in Fig. 2. As the bottom of the tray 10 is substantially flat and in direct contact with the supporting surface 13a of the cooling unit 13, a good heat conducting path is formed therebetween and the substance contained in the freezing tray is readily frozen.

A bracket 14 formed of material having relatively high heat conductivity is welded to the outer end of the tray 10 as indicated at 15 in order to provide a good heat conducting path therebetween. A vertical cylindrical recess 16 is formed in the bracket 14 and an expansible member 17 is arranged in the recess 16 and extends into operative relationship with the supporting surface 13a of the cooling unit 13. The expansible member 17 constitutes a cartridge and contains a body of freezing solution 18 therein. The expansible member 17 is snugly received in a surrounding sleeve 19 interposed between the expansible member 17 and the recess 16. The sleeve 19 is provided with an open lower end 20 through which the expansible member may be inserted and a cylindrical side wall which is threaded adjacent the open end 20, as indicated at 21. The threaded portion 21 of the cylindrical side wall of the sleeve 19 engages a similar internally threaded portion 22 of the bracket 14 adjacent the lower portion of the recess 16. The threaded engagement between the sleeve 19 and the bracket 14 provides for adjustment of the expansible member 17 and the surrounding sleeve 19 within the recess 16 with respect to the supporting surface 13a of the cooling unit 13. Also, a set screw 23 is provided in the side of the bracket 14 in order to lock the sleeve 19 and expansible member 17 carried thereby in any desired adjusted position.

The curved rim 11 of the tray 10 is provided with a projection 24 which extends over the upper end of the bracket 14 and the expansible member 17 carried thereby to give the tray a finished appearance. The outer end of the bracket 14 is provided with oppositely disposed flanges 25 which constitute a handle and facilitate sliding of the tray 10 with respect to the supporting surface 13a of the cooling unit 13. The expansible member 17 is formed of elastic material, such as rubber, having relatively low heat conductivity, and a cap 26 formed of similar material is carried by the lower end of the expansible member 17 in engagement with the supporting surface 13a of the cooling element 13.

A substance to be congealed or frozen is placed in the tray 10 and the tray is positioned on the supporting surface 13a of the cooling unit 13. Heat in the substance contained in the tray 10 flows through the bottom wall thereof into the cooling element 13, causing the substance to be congealed after a time interval. While the substance contained in the tray 10 is being congealed, moisture accumulates between the bottom of the tray and the supporting surface 13a of the cooling unit 13 and forms a frozen bond therebetween which prevents ready removal of the tray 10 from the cooling unit 13. Heat in the body of freezing solution contained in the expansible member 17 flows through the walls of the expansible member, the sleeve 19 and the bracket 14 into the tray 10, and flows through the lower end wall of the expansible member 17 and the cap 26 into the cooling element 13 which causes the body of freezing solution 18 to become frozen. As the body of freezing solution 18 is converted from a liquid to a solid state upon freezing, the volume thereof is increased which causes a force to be exerted between the sleeve 19 carried by the bracket 14 and the supporting surface 13a of the cooling unit 13, the elasticity of the walls of the expansible member 17 accommodating expansion of the body of freezing solution 18. The expansible member 17 thus acts as a temperature responsive motor for lifting the outer end of the tray 10 with respect to the supporting surface 13a of the cooling element 13 to break the frozen bond between the bottom of the tray 10 and the supporting surface 13a of the cooling unit 13. The tray may then be readily removed from the supporting surface 13a of the cooling element 13, as the bracket 14, having the oppositely disposed flanges 25 thereon serves as a handle. The congealed substance contained in the tray 10 is then removed therefrom and the body of freezing solution 18 contained in the expansible member 17 is thawed and converted from a solid to a liquid state. The body of freezing solution 18 may be readily thawed by directing a stream of warm water over the bracket 14 carried by the outer end of the tray 10. After the body of freezing solution 18 has been converted into a liquid state the tray is again ready for use.

The engagement between the threaded portions 21 and 22 on the sleeve 19 and the bracket 14 permits the expansible member 17 to be readily adjusted within the recess 16 and with respect to the supporting surface 13a of the cooling unit 13 in order that all of the expansion of the expansible member 17 may be utilized for lifting the outer end of the tray 10 from the supporting surface 13a of the cooling unit 13. The heat in the substance contained in the tray 10 will readily flow through the bottom wall thereof into the cooling element 13 while the heat in the body of freezing solution 18 will flow therefrom into the tray 10 and the cooling element 13 only at a restricted rate as the expansible member 17 and the cap 26 are formed of material having relatively low heat conductivity, such as rubber. This arrangement transfers a sufficiently limited amount of heat from the body of freezing solution 18 to the tray 10 and to the cooling element 13, to insure that the body of freezing solution 18 contained in the expansible member 17 will be frozen subsequent to congelation of the substance contained in the tray 10. Thus there will be substantially no movement of the outer end of the tray 10 with respect to the supporting surface 13a of the cooling unit 13 to break the frozen bond between the bottom of the tray 10 and the supporting surface 13a of the cooling unit 13 until substantially all of the substance contained in the tray 10 has been congealed.

In Fig. 4 I have shown a modified form of my invention including a shallow rectangular tray or receptacle 30 formed of material having high heat conductivity and having a substantially flat bottom and a curved rim 31 about the upper open end thereof, the curved rim adjacent the outer end of the tray 30 being extended and downwardly curved to provide a handle 32 to facilitate removal of the tray 30 from the supporting surface 13a of the cooling unit 13. Two inverted metal cartridges 33 formed of material having relatively high heat conductivity are secured to the outer end of the tray 30 adjacent the corners thereof and are provided with lower open ends, into each of which a resilient metallic bellows 34 is sealed, as best shown in Fig. 5. Each of the cartridges 33 is secured to the outer end of the tray 30 by a layer of fused metal 35 such, for example, as a layer of solder interposed therebetween. A body of freezing solution 36 is contained in the cartridge 33 and the metallic bellows 34 and a layer of material 37 having relatively low heat conductivity, such as rubber, is carried by the end of the metallic bellows 34 in engagement with the supporting surface 13a of the cooling element 13.

The layer of fused metal 35 has relatively low heat conductivity and is of small cross section, so as to transfer a limited amount of heat from the body of freezing solution 36 contained in the cartridge 33 to the tray 30. The layer of material 37 has relatively low heat conductivity and transfers a limited amount of heat from the freezing solution 36 contained in the cartridge 33 and the metallic bellows 34 into the cooling unit 13. Thus, the layer of fused metal 35 and the layer of material 37 insure that the body of freezing solution 36 contained in the cartridge 33 and the metallic bellows 34 will become frozen subsequent to congelation of the substance contained in the tray 30. When the bodies of freezing solution contained in the cartridges 33 and the bellows 34 begin to freeze, forces will be exerted between the outer end of the tray 30 adjacent the corners thereof and the supporting surface 13a of the cooling element 13 which will lift the outer end of the freezing tray 30 from the supporting surface 13a of the cooling unit 13 to break the frozen bond between the bottom of the tray 30 and the supporting surface 13a of the cooling unit 13. The tray 30 may then be readily removed from the supporting surface 13a of the cooling unit 13 by the handle 32.

The congealed substance contained in the tray 30 may then be removed. The bodies of freezing solution 36 contained in the cartridges 33 and the bellows 34 carried by the outer end of the tray 30 are thawed and converted from a solid to a liquid state rendering the tray 30 again ready for use. These bodies of freezing solution may be readily thawed by directing a stream of warm water over the cartridges 33.

While I have shown particular embodiments of my invention, I do not desire my invention to be limited to the particular constructions shown and described, and I intend in the appended claims to cover all modifications within the spirit and scope of my invention.

What I claim as new and desire to secure by Letters Patent of the United States is:

1. In combination with a cooling unit having a support, a receptacle positioned on said support and adapted to contain a substance to be congealed, means including a temperature responsive motor carried by said receptacle for breaking a frozen bond between said receptacle and said support, a layer of material of relatively low heat conductivity arranged between said motor and said support, and means for transferring a sufficiently limited amount of heat from said motor to said receptacle to operate said motor subsequent to congelation of the substance contained in said receptacle.

2. In combination with a cooling unit having a support, a receptacle positioned on said support and adapted to contain a substance to be congealed, a hollow cartridge carried by said receptacle, a resilient bellows communicating with the interior of said cartridge and having a layer of material of relatively low heat conductivity arranged to separate said cartridge from said support, means including a body of freezing solution contained in said cartridge and said bellows for breaking a frozen bond between said receptacle and said support, and means for transferring a sufficiently limited amount of heat from said body of freezing solution to said receptacle to operate said resilient bellows subsequent to congelation of the substance contained in said receptacle.

3. In combination with a cooling unit having a support, a receptacle positioned on said support and adapted to contain a substance to be congealed, and means including an expansible cartridge carried by said receptacle and containing a body of freezing solution for breaking a frozen bond between said receptacle and said support, said expansible cartridge being formed of material having relatively low heat conductivity and transferring a limited amount of heat from said body of freezing solution to said receptacle for operating said expansible cartridge subsequent to congelation of the substance contained in said receptacle.

4. In combination with a cooling unit having a support, a receptacle positioned on said support and adapted to contain a substance to be congealed, and means including an expansible cartridge carried by said receptacle and containing a body of freezing solution for breaking a frozen bond between said receptacle and said support, said expansible cartridge being formed of material having relatively low heat conductivity and transferring a limited amount of heat from said body of freezing solution to said support for operating said expansible cartridge subsequent to congelation of the substance contained in said receptacle.

5. In combination with a cooling unit having a support, a receptacle positioned on said support and adapted to contain a substance to be congealed, and means including an expansible cartridge carried by said receptacle and containing a body of freezing solution for breaking a frozen bond between said receptacle and said support, said expansible cartridge being formed of material having relatively low heat conductivity and transferring a limited amount of heat from said body of freezing solution to said receptacle and to said support for operating said expansible cartridge subsequent to congelation of the subtsance contained in said receptacle.

6. In combination with a cooling unit having a support, a receptacle positioned on said support and adapted to contain a substance to be congealed, a bracket secured to said receptacle, an expansible member carried by said bracket and extending into operative relationship with said support, means including a body of freezing solution contained in said expansible member for breaking a frozen bond between said receptacle and said support, and means for securing said expansible member to said bracket and for adjusting the position of said expansible member with respect to said support.

7. In combination with a cooling unit having a support, a receptacle positioned on said support and adapted to contain a substance to be congealed, a bracket secured to said receptacle and having a recess therein, an expansible member arranged in said recess and extending into operative relationship with said support, means including a body of freezing solution contained in said expansible member for breaking a frozen bond between said receptacle and said support, and means including a sleeve surrounding said expansible member for securing said expansible member in place and for adjusting the position of said expansible member with respect to said support.

8. In combination with a cooling unit having a support, a receptacle positioned on said support and adapted to contain a substance to be congealed, a bracket secured to said receptacle and having a recess therein, an expansible member arranged in said recess and extending into operative relationship with said support, means including a body of freezing solution contained in said expansible member for breaking a frozen bond between said receptacle and said support, and means including a sleeve surrounding said expansible member and arranged in threaded engagement with said recess for securing said expansible member in place and for adjusting the position of said expansible member with respect to said support.

GEORGE S. HILL.